US011997131B1

(12) United States Patent
Sirianni et al.

(10) Patent No.: US 11,997,131 B1
(45) Date of Patent: May 28, 2024

(54) SYSTEMS AND METHODS INCLUDING MACHINE-LEARNING MODELS FOR DETECTING AND MITIGATING MALWARE

(71) Applicant: ARCHITECTURE TECHNOLOGY CORPORATION, Eden Prairie, MN (US)

(72) Inventors: Joseph Sirianni, Eden Prairie, MN (US); Judson Powers, Eden Prairie, MN (US); Robert Joyce, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 0 days.

(21) Appl. No.: 17/948,980

(22) Filed: Sep. 20, 2022

Related U.S. Application Data

(63) Continuation of application No. 16/417,531, filed on May 20, 2019, now Pat. No. 11,451,581.

(51) Int. Cl.
*G06F 21/00* (2013.01)
*G06N 3/04* (2023.01)
(Continued)

(52) U.S. Cl.
CPC ............. *H04L 63/145* (2013.01); *G06N 3/04* (2013.01); *G06N 3/084* (2013.01); *G06N 20/10* (2019.01);
(Continued)

(58) Field of Classification Search
CPC ............. H04L 63/1425; H04L 63/1433; H04L 63/145; G06N 20/10; G06N 3/04; G06N 3/084
See application file for complete search history.

(56) References Cited

U.S. PATENT DOCUMENTS 7,496,959 B2    2/2009 Adelstein et al.
7,818,804 B2   10/2010 Marceau
(Continued)

FOREIGN PATENT DOCUMENTS

WO    WO-2017/105383 A1    6/2017

OTHER PUBLICATIONS

"Cybersecurity", U.S. Department of Defense Instruction, No. 8500.01, Mar. 14, 2014, incorporating change effective Oct. 7, 2019, accessible at URL: https://www.esd.whs.mil/Portals/54/Documents/DD/issuances/dodi/850001_2014.pdf (58 pages).
(Continued)

*Primary Examiner* — Jeffrey C Pwu
*Assistant Examiner* — Thong P Truong
(74) *Attorney, Agent, or Firm* — Foley & Lardner LLP

(57) ABSTRACT

Disclosed herein are embodiments of systems, methods, and products comprise an analytic server, which detects and defends against malware in-flight regardless of the specific nature and methodology of the underlying attack. The analytic server learns the system's normal behavior during testing and evaluation phase and trains a machine-learning model based on the normal behavior. The analytic server monitors the system behavior during runtime comprising the runtime behavior of each sub-system of the system. The analytic server executes the machine-learning model and compares the system runtime behavior with the normal behavior to identify anomalous behavior. The analytic server executes one or more mitigation instructions to mitigate malware. Based on multiple available options for mitigating malware, the analytic server makes an intelligent decision and takes the least impactful action that have the least impact on the system to maintain mission assurance.

20 Claims, 4 Drawing Sheets

(51) Int. Cl.
G06N 3/084 (2023.01)
G06N 20/10 (2019.01)
H04L 9/40 (2022.01)
(52) U.S. Cl.
CPC ...... H04L 63/1425 (2013.01); H04L 63/1433 (2013.01)

(56) References Cited

U.S. PATENT DOCUMENTS

| | | | |
|---|---|---|---|
| 7,962,961 | B1 | 6/2011 | Griffin et al. |
| 8,156,483 | B2 | 4/2012 | Berg et al. |
| 8,296,848 | B1 | 10/2012 | Griffin et al. |
| 8,458,805 | B2 | 6/2013 | Adelstein et al. |
| 8,499,354 | B1 | 7/2013 | Satish et al. |
| 8,862,803 | B2 | 10/2014 | Powers et al. |
| 9,076,342 | B2 | 7/2015 | Brueckner et al. |
| 9,081,911 | B2 | 7/2015 | Powers et al. |
| 9,083,141 | B2 | 7/2015 | Takushima |
| 9,083,741 | B2 | 7/2015 | Powers |
| 9,384,677 | B2 | 7/2016 | Brueckner et al. |
| 9,626,414 | B2 | 4/2017 | Kanjirathinkal et al. |
| 10,291,638 | B1 | 5/2019 | Chandana et al. |
| 2006/0271345 | A1 | 11/2006 | Kasuya |
| 2012/0210427 | A1 | 8/2012 | Bronner et al. |
| 2014/0321735 | A1 | 10/2014 | Zhang et al. |
| 2014/0337971 | A1 | 11/2014 | Casassa Mont et al. |
| 2015/0106324 | A1 | 4/2015 | Puri et al. |
| 2015/0213260 | A1 | 7/2015 | Park |
| 2015/0264077 | A1* | 9/2015 | Berger .................. G06F 21/51 726/23 |
| 2016/0099953 | A1 | 4/2016 | Hebert et al. |
| 2016/0234242 | A1 | 8/2016 | Knapp et al. |
| 2016/0246662 | A1 | 8/2016 | Meng et al. |
| 2017/0032120 | A1* | 2/2017 | Tolpin .................. G06F 21/53 |
| 2018/0018456 | A1 | 1/2018 | Chen et al. |
| 2018/0048534 | A1 | 2/2018 | Banga et al. |
| 2018/0121657 | A1 | 5/2018 | Hay et al. |
| 2018/0150554 | A1 | 5/2018 | Le et al. |
| 2018/0191770 | A1 | 7/2018 | Nachenberg et al. |
| 2018/0367563 | A1 | 12/2018 | Pfleger de Aguiar et al. |
| 2019/0014153 | A1 | 1/2019 | Lang et al. |
| 2019/0102564 | A1 | 4/2019 | Li et al. |
| 2019/0164015 | A1 | 5/2019 | Jones, Jr. et al. |
| 2019/0188615 | A1 | 6/2019 | Liu |
| 2019/0258953 | A1 | 8/2019 | Lang et al. |

OTHER PUBLICATIONS

"Cyberspace Operations", U.S. Air Force, Air Force Policy Directive 10-17, Jul. 31, 2012, retrieved from URL: https://fas.org/irp/doddir/usaf/afpd10-17.pdf (9 pages).
2015 DFRWS Forensics Challenge, "Submitted Solutions and Source Code Released", GPU Malware Research, retrieved on Mar. 22, 2020 from http://www.cs.uno.edu/-golden/gpumalware-research.html, 5 pages.
Atighetchi et al., "Metrinome-Continuous Monitoring and Security Validation of Distributed Systems", Journal of Cyber Security and Information Systems vol. II, No. 1, Knowledge Management, Mar. 2014, pp. 20-26.
Baloch et al., "Comparative Study of Risk Management in Centralized and Distributed Software Development Environment", Sci. Int.(Lahore), vol. 26, No. 4, 2014, pp. 1523-1528.
Balzarotti et al., "The Impact of GPU-Assisted Malware on Memory Forensics: A Case Study", DFRWS 2015, Elsevier, Digital Investigation, vol. 14, 2015, pp. S16-S24.
Becker et al., "Applying Game Theory to Analyze Attacks and Defenses in Virtual Coordinate Systems," 41st International Conference on Dependable Systems & Networks (DSN), Jun. 2011, pp. 133-142.
Cerias: "Memory Analysis, meet GPU Malware", Oct. 22, 2014, Retrieved from http://www.cerias.purdue.edu/news_and_events/events/security_seminar/delails/index/popenihmencsf2v5mggg5ulfd4, 2 pgs.
Challagulla et al., "Empirical Assessment of Machine Learning based Software Defect Prediction Techniques", Proceedings of the 10th IEEE International Workshop on Object-Oriented Real-Time Dependable Systems (WORDS'05), Feb. 2-4, 2005, 8 pages.
Fisher, "Developing Software in a Multicore & Multiprocessor World," Klocwork White Paper, Klocwork.com., Sep. 2010, pp. 1-11.
Jones, "Software Defect Origins and Removal Methods," International Function Point Users Group, Capers Jones, Dec. 28, 2012, pp. 1-31.
Joyce et al., "Mega: A Tool for Mac OS X Operating System and Application Forensics," Digital Investigation, vol. 5, Elsevier, Proceedings of the Digital Forensic Research Conference, Aug. 11-13, 2008, pp. 583-590.
Kimball, "Silverline Human Performance Detection (Silverline-HPD)", Phase 1 SBIR Proposal, Architecture Technology Corporation, SB172-007, D172-007-0014, Jul. 20, 2017, 17 pages.
Libicki, "Cyberdeterrence and Cyberwar," Rand Corporation, Project Air Force, 2009, 240 pages.
Mchale, "The Aegis Combat System's continuous modernization", Military Embedded Systems, Retrieved on Mar. 22, 2020 from http://mil-Embedded.com/articles/the-aegis-combat-systems-continuous-modernization/, 8 pages.
Non-Final Office Action on U.S. Appl. No. 16/417,531 dated Nov. 12, 2021.
Notice of Allowance on U.S. Appl. No. 16/417,531 dated May 17, 2022.
Porche III et al., "A Cyberworm that Knows No. Boundaries", RAND Corporation, National Defense Research Institute, 2011, 55 pages.
PR Newswire, "ATCorp Releases CSAS-Cloud Security Analysis Suite for Applications in the Cloud", Architecture Technology Corporation, Feb. 26, 2016, 4 pages.
Quinlan et al., "ROSE User Manual: A Tool for Building Source-to-Source Translators", Draft User Manual, Version 0.9.11.115, Lawrence Livermore National Laboratory, Sep. 12, 2019 (337 pages).
Rahman et al., "Defect Management Life Cycle Process for Software Quality Improvement, " World Academy of Science, Engineering and Technology International Journal of Computer and Information Engineering, vol. 9, No. 12, 2015 3rd International Conference on Artificial Intelligence, Modelling and Simulation, Nov. 24, 2015, pp. 241-244.
Richard III, "Memory Analysis, Meet GPU Malware", University of New Orleans, CERIAS, Oct. 22, 2014, retrieved from URL: http://www.cerias.purdue.edu/news_and_events/events/security_seminar/details/index/popenihmencsf2v5mggg5ulfd4 (2 pages).
Robbio, "How Will AI Impact Software Development?", Forbes Technology Council, Aug. 31, 2017, retrieved on Mar. 23, 2020 from https://www.forbes.com/sites/forbestechcouncil/2017/08/31/how-will-ai-impact-software-development/#325be7e7264d, 16 pages.
ROSE: Main Page, Lawrence Livermore National Laboratory, retrieved on Mar. 23, 2020 from http://rosecompiler.org/ROSE_HTML_Reference/, 3 pages.
Schneier, B., "Attack Trees—Schneier on Security", Dr. Dobb's Journal, Dec. 1999, retrieved Mar. 23, 2020 from URL: https://www.schneier.com/academic/archives/1999/12/attack_trees.html (9 pages).
Shiva et al., "Game Theory for Cyber Security," Proceedings of the Sixth Annual Workshop on Cyber Security and Information Intelligence Research, Article No. 34, Apr. 2010, 10 pages.
Sironi et al., "Metronome: Operating System Level Performance Management via Self-Adaptive Computing", DAC 2012, Jun. 3-7, 2012, pp. 856-865.
Snyder et al., "Ensuring U.S. Air Force Operations During Cyber Attacks Against Combat Support Systems—Guidance for Where to Focus Mitigation Efforts," RAND Corporation, 2015, 37 pages.
Vasiliadis et al., "GPU-Assisted Malware", 2010 5th International Conference on Malicious and Unwanted Software, 2010, pp. 1-6.

(56) References Cited

OTHER PUBLICATIONS

Wikipedia—Opencl, Mar. 29, 2017, Retrieved from https://en.wikipedia.org/wiki/OpenCL, 23 pages.

* cited by examiner

SYSTEMS AND METHODS INCLUDING MACHINE-LEARNING MODELS FOR DETECTING AND MITIGATING MALWARE

CROSS-REFERENCE TO RELATED APPLICATIONS

This application is a continuation application of U.S. application Ser. No. 16/417,531, entitled "Systems and Methods for Malware Detection and Mitigation," filed May 20, 2019, which is incorporated by reference in its entirety.

This application relates to U.S. application Ser. No. 16/012,651, filed Jun. 19, 2018, titled "Systems and Methods for Improving the Ranking and Prioritization of Attack-Related Events," U.S. application Ser. No. 15/485,784, filed Apr. 12, 2017, titled "Software Assurance System for Runtime Environments," and U.S. application Ser. No. 15/622,434, filed Jun. 14, 2017, titled "Software Assurance for Heterogeneous Distributed Computing Systems," each of which is hereby incorporated by reference in its entirety.

TECHNICAL FIELD

This application relates generally to methods and systems for malware detection and mitigation.

BACKGROUND

Sophisticated latent malware is an increasing threat to computing systems and impedes mission assurance. The latent malware may remain undetected during development, testing and evaluation, mission preparation, and platform maintenance. Conventional cybersecurity approaches to thwarting the latent malware are not sufficient for detecting and warding off cyberattacks. Attackers may continually develop increasingly invasive malware using zero-day exploits with obfuscation to prevent detection. Conventional signature based anti-virus solutions may therefore be easily subverted. These anti-virus solutions rely upon signatures of known malwares and fail to identify new malwares.

Latent malware may add an additional layer of difficulty in detecting malicious behavior because a malware may not be active until runtime or critical stages of runtime. For example, malwares are programmed to stay inactive until a system state is met before activation. For example, a latent malware may obfuscate its payload until it is on the target systems. This can be especially effective in weapon systems by waiting until the systems is being used in a live mission. This may make file system baselining ineffective because a third-party software supply chain may be compromised and inadvertently submit binaries with built-in latent malware. Subsequent baselines may believe that software is trusted and subvert file integrity monitoring.

The second shortcoming of the conventional automated anti-virus solutions is that they do not provide adequate tools to make intelligent reactionary measure. Specific components may require a more sophisticated response for the system to remain functional as a whole. Real-time human-in-the-loop solutions may also not be feasible due to time constraints or the inability for a human to interact with the system. Communications could be interrupted, delayed, or not enough information could be available for a human to respond in a way that would reasonably prevent the damage of the malware.

SUMMARY

What is therefore desired are systems and method for detecting and defending against malwares during runtime of a computing system regardless of the specific nature and methodology of the underlying attack. The systems and methods may not have an a priori knowledge of the signatures of the malwares. Embodiments described herein attempt a technical solution to the aforementioned technical problems and may provide solutions to other programs as well. Embodiments disclosed herein describe an illustrative cybersecurity system that may learn a computing system's normal behavior during testing and evaluation phase and identify potential threats when the computing system diverges from the learned expected behavior during runtime. The cybersecurity system may comprise a kernel-based system call interception monitor that may utilize analysis of the system during normal operation to detect malicious behavior during a live mission. The cybersecurity system may train a machine-learning model based on the normal behavior during the testing and evaluation phase. The cybersecurity system may monitor the computing system behavior during runtime and compare the runtime behavior with the normal behavior using the machine-learning model to detect potential threats.

The cybersecurity system may also perform automatic operations to prevent malware based on intelligent decisions on impact of the malware. The cybersecurity system may not disrupt or reduce the performance of the computing system as a whole by doing an impact assessment of the malicious behavior. The cybersecurity system may weigh the malicious behavior against available options to select the least damaging recourse to system operation. Furthermore, the cybersecurity system may utilize lightweight anomaly detection algorithms and may have an insignificant impact on the system performance.

In one embodiment, a computer-implemented method comprises generating, by a server, kernel level feature vectors of system call hierarchy during testing phase of a computing system; training, by the server, a machine-learning model based upon the kernel level feature vectors for the machine-learning model to learn a normal behavior of the computing system; retrieving, by the server, a first set of system calls of a first sub-system of the computing system during runtime of the computing system; retrieving, by the server, a second set of system calls of a second sub-system of the computing system during runtime of the computing system; executing, by the server, the machine-learning model on the first and the second sets of system calls to compare the runtime behavior of the computing system with the normal behavior; and in response to the server determining that the runtime behavior deviates from the normal behavior over a predetermined threshold: instructing, by the server, the computing system to execute one or more mitigation instructions.

In another embodiment, a computer system comprises a computing system comprising a first sub-system and a second sub-system; a server in communication with the computing system and configured to: generate kernel level feature vectors of system call hierarchy during testing phase of the computing system; train a machine-learning model based upon the kernel level feature vectors for the machine-learning model to learn a normal behavior of the computing system; retrieve a first set of system calls of the first sub-system of the computing system during runtime of the computing system; retrieve a second set of system calls of the second sub-system of the computing system during runtime of the computing system; execute the machine-learning model on the first and the second sets of system calls to compare the runtime behavior of the computing system with the normal behavior; and in response to determining that the runtime behavior deviates from the normal behavior over a predetermined threshold: instruct the computing system to execute one or more mitigation instructions.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
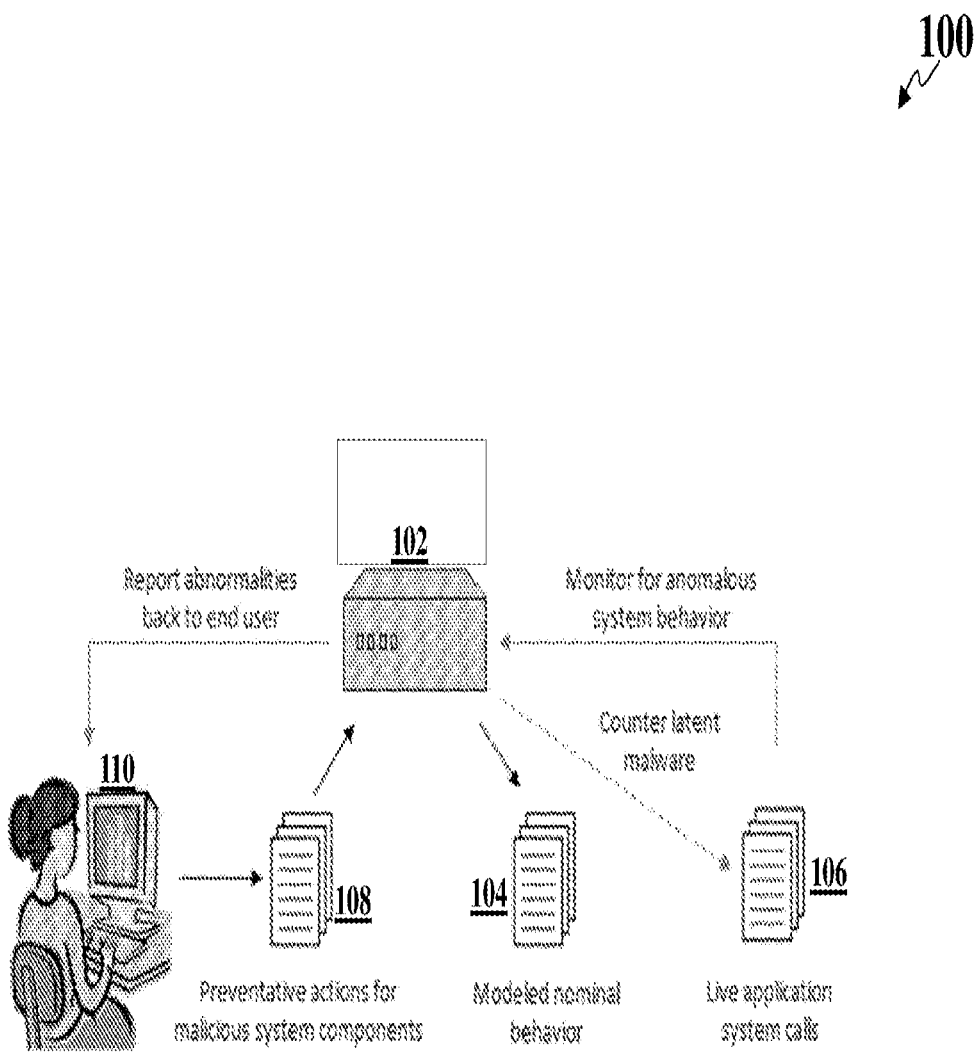
FIG. 1 shows an illustrative computer system for malware detection and mitigation, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe an analytic server that builds the cybersecurity application with the ability to detect and respond to malware in-flight in tactically relevant time scales in order to provide mission assurance. The analytic server may define tactical relevance of cyber effects with respect to mission cost, for example, by ingesting cyber mission impact assessments (CMIA). In addition, the analytic server may use lightweight algorithms to detect malware in-flight without unduly consuming host processing resources or memory storage. The algorithms may provide sufficient diagnostic capability to direct an appropriate response while simultaneously meeting size, weight, and power (SWAP) requirements for the computing system. Because a repository of malware does not exist from which algorithms can be based, the algorithms used for detection may assume that minimal or no training data (e.g., malware samples) are available. A computing system may deploy the cybersecurity application during testing and evaluation to learn expected operational behavior and a system administrator may import the CMIA into the cybersecurity application to program actions to be taken when a system component shows anomalous behavior.

The analytic server may need to demonstrate not only malware detection but also rapidly understand and diagnose malicious effects so that it can direct a customized system response to provide mission assurance. The analytic server may integrate the malware detection algorithm with other cyber sensing capabilities (e.g., secure hypervisors, hardware-based bus/network monitors/mediators) to enhance its detection capability and formulate an intelligent response based on the diagnostic results to address the threat.

The analytic server may provide a solution for malware detection and mitigation through the unique combination of anomaly detection techniques to learn normal behavior to thwart latent malware during a live mission and intelligent assessment to minimize malware impact and retain mission assurance. The analytic server may perform the bulk of learning and defense before or in parallel with the system execution rather than interrupting the system processing. Additionally, the analytic server may provide an effective layer of shielding against unknown cyber-attacks on top of detecting integrity violations. By integrating the monitoring techniques into the kernel, the analytic server may make it difficult for malware to attack directly.

The increase in commercial off-the-shelf (COTS) hardware and software integrated into the computing system, developed across multiple vendors, may provide opportunities for adversaries to compromise the COTS components. The analytic server may apply machine learning and rule based algorithms to model the system while properly functioning to detect COTS products infected with latent malware that becomes active during a live mission. The analytic server may detect previously undiscovered attacks that change the systems' normal behavior.

FIG. 1 shows components of a system 100 for malware detection and mitigation, according to an embodiment. The system 100 may comprise an analytic server 102 that builds a cybersecurity application that learns a computing system's expected behavior during the testing and evaluation phase to later detect anomalous behavior during live missions and make intelligent actions to reduce and prevent the impact of latent malware. The computing system may be any number of devices and systems connected with each other over a distributed network. Such devices and systems may be under monitor and management of the analytic server 102. The cybersecurity application of the analytic server 102 may detect not only software anomalies, but hardware anomalies as well in the computing system.

The analytic server 102 may build a cybersecurity application that operates as a kernel module and conducts analysis of the computing system behavior during testing and evaluation. Based on the analysis of system behavior during testing and evaluation, the analytic server 102 may generate a known-good operational baseline including the normal behavior 104 of the computing system. The analytic server 102 may store the normal behavior of the computing system into a database. The analytic server 102 may monitor the computing system during live missions to look for anomalies and detect unexpected behavior from latent malware. Specifically, the analytic server 102 may run the cybersecurity application as a kernel module on each sub-system of the computing system to intercept the live application system calls 106 as the system calls occur. The analytic server 102 may compare sequences and return values of the system calls 106 to the past normal behavior 104 to detect potentially malicious activities. When the analytic server 102 detects latent malware in the computing system, the analytic server 102 may report abnormalities to an end user device 110 (e.g., used by a system administrator). For example, the analytic server 102 may display a graphical user interface (GUI) on the end user device 110 comprising the abnormalities in the malicious system components and corresponding preventative actions 108. The preventative actions 108 may be reactive measures for software and hardware components infected with malware. The analytic server 102 may respond to the malware in real-time based on the preventative actions 108. For example, the analytic server 102 may block the malicious applications from performing the attempted action.

The analytic server 102 may detect anomalous system behavior in live application system calls 106 based on a hierarchical risk model. Specifically, the analytic server 102 may build a hierarchical risk model comprising attack trees, which were created to support systematic investigation of attack modalities. A top-level attack goal such as modifying stored data is at the root of the attack tree. The children of the goal are sub-goals, such as modifying the data during computation or modifying the data in storage. Sub-goals may be disjunctive (one of the sub-goals must be met) or conjunctive (all sub-goals must be met). Leaf sub-goals are those that might be met because of a vulnerability in the system. For example, an attacker may insert a known-weak encryption algorithm, allowing an adversary to easily decode encrypted data in transit. Therefore, the attack tree may illustrate how vulnerabilities and malware can be exploited to achieve the attacker's goal.

The analytic server 102 may augment the hierarchical risk model with structural enhancements to better describe risks to the computing system. The analytic server 102 may make use of NIST (National Institute of Standards and Technology) Security Content Automation Protocol (SCAP) standards, such as the Open Vulnerability and Assessment Language (OVAL), Common Weakness Enumeration (CWE), and the Common Vulnerabilities and Exposures (CVE) database to build the attack tree hierarchical risk model. The analytic server 102 may expand the evaluation capability of attack tree model to import CMIA data to give users finer control over actions to be taken based on the impact assessment of the component being affected. The analytic server 102 may use weights from CMIA documents to assess the impact of malware and further determine countermeasures and mitigation actions to prevent the malware from completing its goal. With given weights, the analytic server 102 may determine the mitigation actions more intelligent and adaptive for the given situation.

The analytic server 102 may extend the hierarchical risk model even further to generate a system call hierarchy during the testing phase and merge those of other similar systems to build a complete profile of the expected behavior (e.g., modeled normal behavior 104). The analytic server 102 may provide the user a GUI of a complete view of all the components of the system and the modifications to the system during runtime (e.g., live application system calls 106) on the end user device 110. A user may apply mitigations (e.g., preventative actions 108 for malicious system components) based on the system component that is acting maliciously, and the impact it will have on the system. The analytic server 102 may implement a variety of options on the end user device 110 for the user to thwart the latent malware including: changing the anomalous system call parameter to a specific value or the expected value, changing the anomalous return value to a specific value or the expected value; ending the program entirely; and/or executing a script on the system to do more advanced mitigation actions. The variety of options of the preventative actions 108 for malicious system components may provide an adequate toolset to intelligently block malware from achieving the intended goal and maintain mission success.

The analytic server 102 may be any computing device comprising a processor and other computing hardware and software components, configured to perform the various tasks described herein. The analytic server 102 may be logically and physically organized within the same or different devices or structures, and may be distributed across any number of physical structures and locations (e.g., cabinets, rooms, buildings, cities).

The end user device 110 may be any computing device allowing a user to interact with the analytic server 102. The end user device 110 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The end user device 110 may comprise any number of input and output devices supporting various types of data, such as text, image, audio, video, and the like.

Figure 2:
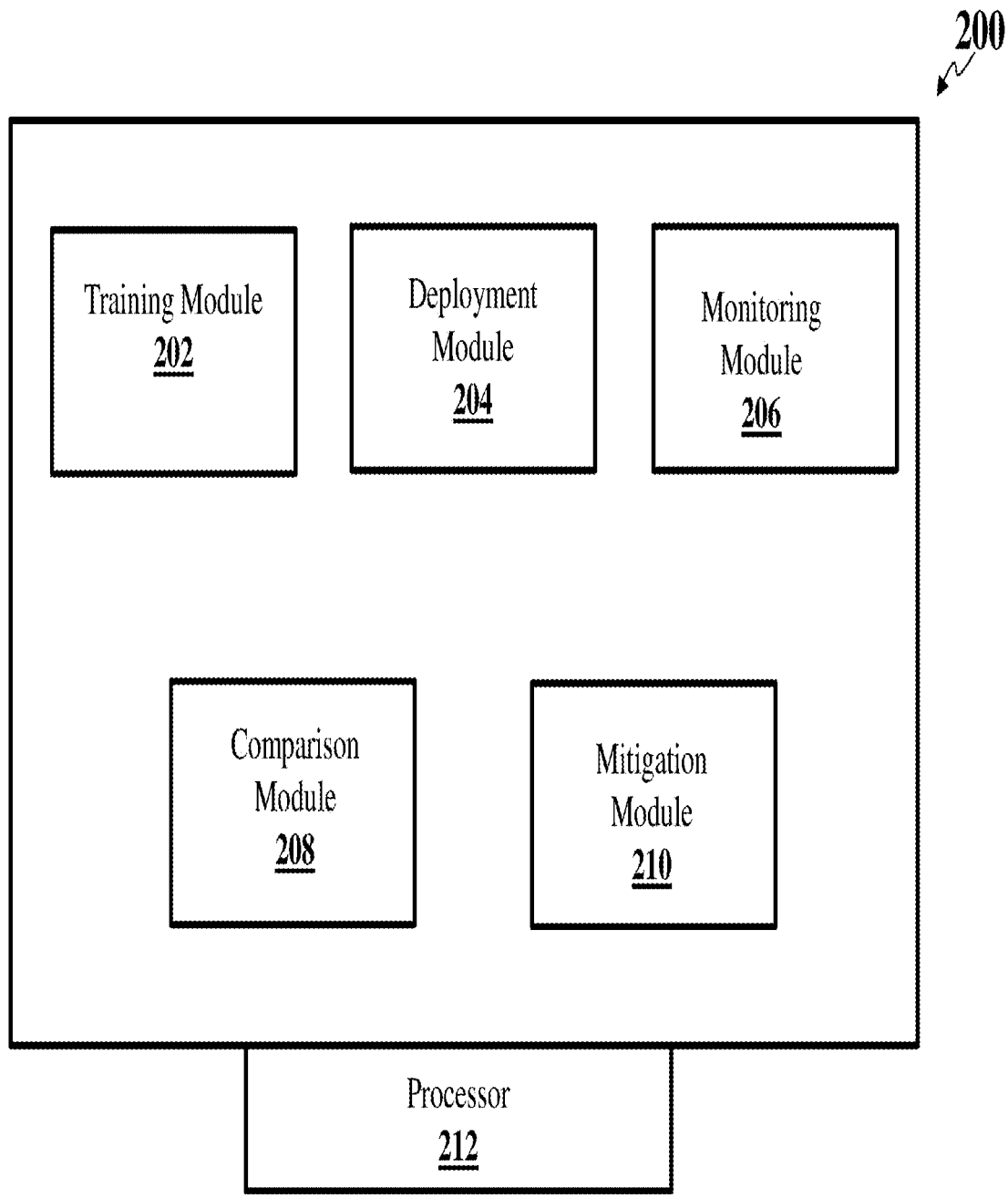
FIG. 2 shows a block diagram of illustrative software modules of malware detection and mitigation, according to an embodiment.

FIG. 2 shows a block diagram for software modules 200 of malware detection and mitigation, according to an embodiment. A processor 212 of the analytic server may execute the software modules 200 including training module 202, deployment module 204, monitoring module 206, comparison module 208, and mitigation module 210.

The training module 202 may monitor a system during the testing and evaluation phase to learn the normal behavior of the system. The training module may use different algorithms to train a machine-learning model. For example, the training module 202 may employ one or more algorithms and/or combination of different algorithms, such as n-gram, neural networks (NNs), support vector machine (SVMs), decision trees, linear and logistic regression, clustering, association rules, and scorecards for the machine-learning model training.

The deployment module 204 may deploy the trained machine-learning model to determine anomalous behavior of the system during runtime. For example, the deployment module 204 may take the system parameters and return values of system calls during runtime as input of the machine-learning model, and output the detection results of the anomalous behavior of the system.

The monitoring module 206 may monitor both software and hardware behaviors. The monitoring module 206 may intercept system calls between applications and the hardware. A system may comprise multiple sub-systems with each subsystem having one or more system calls. The monitoring module 206 may combine system call hierarchies across sub-systems to provide a complete understanding of the expected behavior of individual sub-system components.

The comparison module 208 may use the normal behavior of the training module 202 to compare against the system behavior during runtime to detect anomalous behavior in a live mission. Using the system call data (e.g., system arguments/parameters, return values) of the monitoring module 206, the comparison module 208 may apply a hybrid approach of rules combined with machine-learning algorithms to discover unanticipated or potentially malicious program flows. For example, the system call data may pass through a rules engine and a machine-learning engine (e.g., machine-learning model).

The mitigation module 210 may take intelligent mitigation efforts to thwart the latent malware. The mitigation module 210 may provide impact assessment of the malware and the available options to prevent the malware. The mitigation module 210 may take the least impactful action to prevent the malware. The mitigation module 210 may respond to the malware in real-time and block the malicious applications from performing the attempted action.

Figure 3:
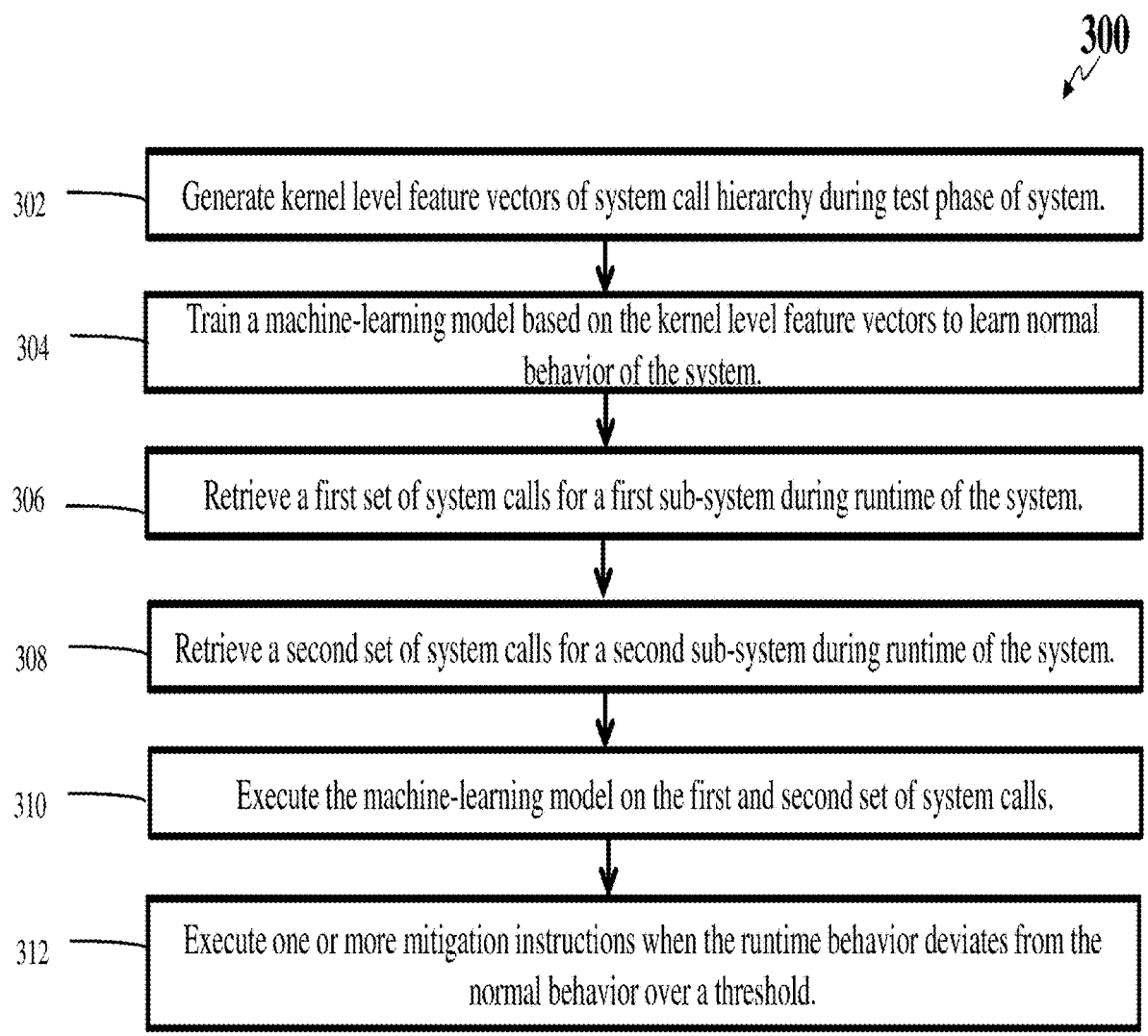
FIG. 3 shows a flowchart for an illustrative method of malware detection and mitigation, according to an embodiment.

FIG. 3 shows a flowchart 300 for malware detection and mitigation, according to an embodiment. Other embodiments may comprise additional or alternative steps, or may omit some steps altogether.

At step 302, the analytic server may generate kernel level feature vectors of system call hierarchy during test phase of the computing system. The analytic server may monitor the system calls of the computing system during the test and evaluation phase. The computing system may comprise multiple sub-systems. The analytic server may monitor the system calls from the different sub-systems. Based on the monitoring, the analytic server may generate kernel level feature vectors of system call hierarchy, which may comprise system parameters/arguments, return values, and other values corresponding to the normal behavior processes. Such kernel level feature vectors may include the normal behavior features of the whole system including the hierarchy of the sub-systems. In addition, the kernel level feature vectors may comprise the normal behavior features of both software and hardware of the computing system. The analytic server may generate a system call hierarchy during the testing phase and merge those of other similar systems to build a complete profile of the expected behavior.

At step 304, the analytic server may train a machine-learning model based on the kernel level feature vectors for the machine-learning model to learn the normal behavior of the computing system. The analytic server may use different algorithms to train a machine-learning model. For example, the analytic server may employ one or more algorithms and/or combination of different algorithms, such as n-gram, neural networks (NNs), support vector machine (SVMs), decision trees, linear and logistic regression, clustering, association rules, and scorecards for the machine-learning model training.

In some embodiments, the analytic server may utilize a specialized convolutional neural network to build the machine-learning model. The specialized convolutional neural network may enable modeling of system call trees (e.g., system call hierarchy) to make desired predictions based on learned distinguish features. Each training example may be a system call tree collected during normal behavior. The analytic server may label the training examples with descriptions of the type of normal behavior that are relevant to the collected operations such as the process name. The analytic server may then train the specialized system call tree models with supervised learning to predict call examples collected during system operation. Anomalous system activities may be identified when a process's system call tree does not fit any known normal system processes.

At step 306, the analytic server may retrieve a first set of system calls for a first sub-system of the computing system during the runtime of the computing system. The analytic server may monitor the computing system during the runtime of the computing system. The computing system is comprised of multiple sub-systems. The analytic server may monitor and retrieve a set of system calls for each sub-system. For example, for a first sub-system, the analytic server may monitor the system calls corresponding to both software and hardware behavior to generate the system call dataset for the first sub-system. For instance, the analytic server may generate an ordered list of the system calls including arguments and return values of each program operation in the first sub-system.

The analytic server may implement system call interception using dynamic kernel trace points, which provides a means to hook the monitoring into a running kernel. Kernel modules may generate the trace points on the fly and not create any overhead unless intercepted. The analytic server may notify a user for each call. The user may choose to ignore, deliver, or modify the signal before allowing the trace to continue. Using dynamic kernel trace points, the analytic server may modify the number of system calls being intercepted and reduce the overhead caused by the amount of data being analyzed. As a result, the cybersecurity application may scale with the systems hardware constraints, and reduce the impact it has on the systems operations. When the analytic server intercepts each program's system calls, the result may be an ordered list of the system calls (for each thread), including arguments and return values. The analytic server may save the result into a file for later analysis. In some embodiments, the analytic server may compress the system call list through hashing to save cost of storage and processing power.

At step 308, the analytic server may retrieve a second set of system calls for a second sub-system of the computing system during the runtime of the computing system. The analytic server may monitor the system calls corresponding to both software and hardware behavior for the second sub-system during the runtime of the computing system. Based on the monitoring, the analytic server may generate the system call dataset for the second sub-system. For example, the analytic server may generate another ordered list of the system calls including arguments and return values of each program operation in the second sub-system.

As described above, the analytic server may implement system call interception using kernel trace points to monitor the system behavior. The analytic server may monitor and retrieve system calls for each sub-system of the computing system. The analytic server may combine system call hierarchies across sub-systems to provide a complete understanding of the system behavior of individual sub-system components and generate an entire system call hierarchy for program operations corresponding to the system calls.

The analytic server may provide different ways to display a program operation. For example, the analytic server may display the entire system call hierarchy, allowing the user to check a system state at any given point of the program runtime. In another approach, the analytic server may create a flat structure for each program and group system calls into general operations that the program made over the testing and evaluation phase. For example, a program may have made file operation requests, and the user may apply a directory-based file operation restriction if a future file operation is anomalous. The analytic server may also create a view that provides the user the ability to apply catch-all mitigations that are applicable to all programs.

Figure 4:
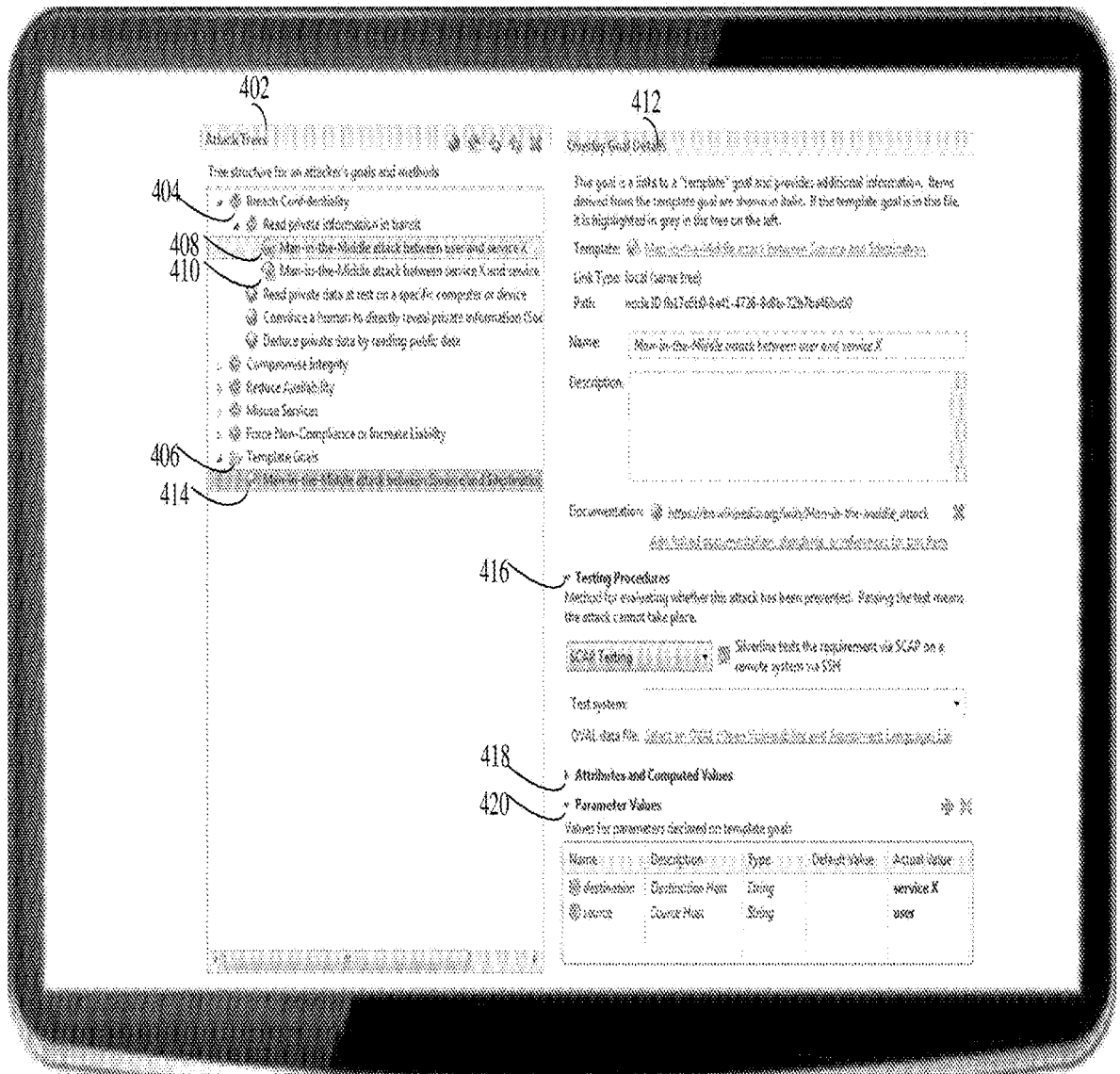
FIG. 4 shows an illustrative graphical user interface for a hierarchical risk model based on an attack tree, according to an embodiment.

At step 310, the analytic server may execute the machine-learning model on the first and second sets of system calls to compare the runtime behavior of the computing system with the normal behavior. The analytic server may detect anomalous system behavior based on a hierarchical risk model. The hierarchical risk model may comprise an attack tree based on attack detection rules. The hierarchical risk model may be an executable logic for detecting attacks. The attack detection rules may be from user configuration and/or knowledge learned from the normal behavior and from the machine-learning model. In some embodiments, the analytic server may provide a GUI for the user to define customized functions and rules. FIG. 4 illustrates an example of a user interface for managing the hierarchical risk model.

The analytic server may apply a hybrid approach of rules combined with machine-learning model on the first and second sets of system calls to discover unanticipated or potentially malicious program flows. For example, the system call data may pass through both a rules engine and a machine-learning engine (e.g., machine-learning model).

In the rule engine, the analytic server may compare the system runtime behavior with a set of rules input by a user and/or determined by the machine-learning model. The set of rules may comprise triggers for likely malicious activity that has little likely value in legitimate code. For example, loading a kernel driver as well as starting graphical processing unit (GPU)-accelerated code within the same process if suspect because those two functions are typically not used in the same computational process. Similarly, certain set of arguments to system calls may be flagged as creating specific vulnerabilities, even if not intentionally malicious. The analytic server may flag such arguments as warnings.

Because the set of rules alone may not be sufficient to specify legitimate code, any call flows that do not trigger alerts or warnings may then pass through the machine-learning engine. The machine-learning engine may further determine if the system runtime behavior is anomalous by deploying the trained machine-learning model. For example, the analytic server may take the first and second sets of system calls (e.g., system parameters/arguments and return values) as input of the machine-learning model. The machine-learning model may compare the runtime behavior of the computing system with the normal behavior learned during the training and output the detection results of the anomalous behavior of the computing system.

Once the rules and machine-learning algorithms have been applied to the system call dataset, the analytic server may combine the results of the rule engine and the machine-learning engine with relative weights in order to minimize false alarms. For instance, a given rule may have a weight corresponding to the rule's likelihood of flagging malicious behavior. The machine-learning model may have a weight corresponding to a confidence value (e.g., the likelihood of flagging malicious behavior) produced by the neural network of the machine-learning model for the same data.

At step 312, the analytic server may execute one or more mitigation instructions when the runtime behavior deviates from the normal behavior over a predetermined threshold. As discussed above, the analytic server may apply the rules and the machine-learning algorithms to the system call dataset and combine the results of the rule engine and the machine-learning engine with relative weights. The analytic server may determine a probability of the runtime behavior being malicious which may indicate the level of the runtime behavior deviates from the normal behavior. When the probability of runtime behavior is over a predetermined threshold, the analytic server may execute one or more mitigation instructions. The analytic server may automate reactive measures for software and hardware components infected with the malware. In some embodiments, the analytic server may extend the hierarchical risk model to provide a GUI for users to input mitigation rules for the program operations. The GUI may comprise additional editing tools for the user to implement rules and impact weights for mitigating malware.

The analytic server may implement a variety of options for the users to thwart the latent malware including: changing the anomalous system call parameter to a specific or the expected value; changing the anomalous return value to a specific or the expected value; ending the program entirely; and/or executing a script on the system to do more advanced mitigation actions. The variety of options for thwarting the latent malware may provide users with a meaningful way to organize and apply mitigations as specific system components showing anomalous behavior. By mediating calls between hardware and software, the analytic server may provide many avenues of resources for a user to implement.

In addition, the analytic server may determine recommended weights to system calls/operations based on the inherent risk. For example, the system calls/operations that have a greater inherent risk when exploited by latent malware may have a larger weight value. The weights may be configurable for individual system components, which may influence the intelligent mitigation. The analytic server may determine the one or more mitigation instructions for anomalous system behavior based on the weight value of the system call associated with the anomalous system behavior. For example, the analytic server may make intelligent decisions on the actions to mitigate malware based on the weights of the system operations. For a system call/operation with a larger weight value, the analytic server may determine that the risk of the system call/operation is greater and may take more strict actions to prevent the system call/operation. For instance, the analytic server may end the system operation entirely.

In addition, the analytic server may automatically evaluate the risks of the runtime system behavior and ingest CMIA data to provide impact assessment of the malware and the available options to take. Based on the available options, the end user or the analytic server may take the least impactful action. As a result, paring the configurable weights with CMIA may enable the cybersecurity application to take the actions, which may have the least impact on the system to maintain mission assurance.

FIG. 4 shows an example of the GUI 400 for the hierarchical risk model based on an attack tree, according to an embodiment. As discussed above, the analytic server may detect anomalous system behavior based on a hierarchical risk model comprising an attack tree. The attack tree may be an executable logic for detecting attacks. The analytic server may integrate the results of the system call monitoring into the hierarchical risk model to evaluate the system call results in context. The analytic server may interrogate the system call results to find resources used by each program via system calls to create an XML (Extensible Markup Language) form. This file format and the GUI 400 may be extensible and allow for addition of arbitrary computed attributes and other data to be stored with each program data in the model.

As shown in FIG. 4, the hierarchical risk model 402 may comprise breach confidentiality, compromised integrity, reduce availability, misuse services, force non-compliance or increase liability, etc. Although the hierarchical risk model 402 is in a directory structure, the analytic server may also show a traditional boxes-and-arrows tree diagram. In the example of breach confidentiality 404, the breach confidentiality may require reading private information in transit, or reading private data at rest on a specific computer or device, or convincing a human to directly reveal private information, or deduce private data by reading public data, etc. In order to make it possible to model large systems, the analytic server may have templates for common things that occur in the attack tree, like a man-in-the-middle attack in this particular example. The template of man-in-the-middle attack may allow a user to review and configure the related information. For example, the template of man-in-the-middle attack between source and destination 414 under template goals 406 may have two different cases: man-in-the-middle attack between user and service X 408 and man-in-the-middle attack between service X and service Y 410. Once the user selects the case of man-in-the-middle attack between user and service X 408, the analytic server may display the user interface for overlay goal details 412. The displayed overlay goal details 412 may comprise various information about the template including template identifier, link type, path, name, description and documentation. The documentation may be a web link. The overlay goal details 412 may also comprise user interfaces of editing tools, including testing procedures 416, attributes and computed values 418, parameter values 420. By interacting with such user interfaces, the user may be able to associate different metadata, various attributes with items of the attack tree and evaluate the system in various ways. In addition, such user interfaces may allow the user to input mitigation rules. Such user interfaces may provide the user the ability to implement rules and impact weights for mitigating malware.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   training, by the server, a machine-learning model by applying the machine-learning model on a plurality of training kernel-level feature vectors generated for a plurality of training system calls to learn a normal behavior of the computing system, wherein the machine-learning model learns the normal behavior of the computing system based on detection results of anomalous behavior from system parameters and return values of the plurality of system calls from the plurality of training kernel-level feature vectors;

obtaining, by the server, one or more runtime system calls performed by the computing system during runtime execution; and for each particular runtime system call of the one or more runtime system calls:

determining, by the server, a level of deviation between the runtime system call and the normal behavior of the computing system, by applying the machine-learning model on a plurality of runtime kernel-level feature vectors generated for the particular runtime system call; and generating, by the server, a maliciousness probability for the particular runtime system call based upon the level of deviation.

2. The method according to claim 1, wherein generating the maliciousness probability for the runtime system call includes generating, by the server, a confidence value for the runtime system call based upon the corresponding maliciousness probability and one or more weighted values.

3. The method according to claim 1, wherein training the machine-learning model includes applying the machine-learning model on a plurality of labels corresponding to the plurality of training system calls.

4. The method according to claim 1, further comprising instructing, by the server, the computing system to execute one or more mitigation instructions, in response to the server determining that the maliciousness probability satisfies a predetermined threshold for malware detection.

5. The method according to claim 4, wherein the one or more mitigation instructions comprises at least one of: changing an anomalous system call parameter to a specific value, changing an anomalous return value to a specific value, halting the system calls, or executing a script on the computing system.

6. The method according to claim 4, wherein the server determines the one or more mitigation instructions based upon the maliciousness probability generated for the current system call.

7. The method according to claim 4, further comprising:
generating, by the server, an output of the maliciousness probability for a graphical user interface of a user; and
receiving, by the server, an input of a mitigation instruction for the runtime system call via the graphical user interface from the user.

8. The method according to claim 1, further comprising determining, by the server, that the runtime behavior for the runtime system call deviates from the normal behavior based on a hierarchical risk model comprising an attack tree.

9. The method according to claim 1, further comprising applying, by the server, a hybrid approach including a rules-based engine combined with the machine-learning model on one or more system calls.

10. The method according to claim 9, wherein the rules-based approach identifies anomalous behavior in the one or more system calls using at least one of: a system argument, a parameter, or a return value.

11. A system comprising:
a server comprising a processor configured to:
train a machine-learning model by applying the machine-learning model on a plurality of training kernel-level feature vectors generated for a plurality of training system calls to learn a normal behavior of the computing system, wherein the machine-learning model learns the normal behavior of the computing system based on detection results of anomalous behavior from system parameters and return values of the plurality of system calls from the plurality of training kernel-level feature vectors;

obtain one or more runtime system calls performed by the computing system during runtime execution; and for each particular runtime system call of the one or more runtime system calls:

determine a level of deviation between the runtime system call and the normal behavior of the computing system, by applying the machine-learning model on a plurality of runtime kernel-level feature vectors generated for the particular runtime system call; and generate a maliciousness probability for the particular runtime system call based upon the level of deviation.

12. The system according to claim 11, wherein, when generating the maliciousness probability for the runtime system call, the server is further configured to generate a confidence value for the runtime system call based upon the corresponding maliciousness probability and one or more weighted values.

13. The system according to claim 11, wherein, when training the machine-learning model, the server is further configured to apply the machine-learning model on a plurality of labels corresponding to the plurality of training system calls.

14. The system according to claim 11, wherein the server is further configured to instruct the computing system to execute one or more mitigation instructions in response to the server determining that the maliciousness probability satisfies a predetermined threshold for malware detection.

15. The system according to claim 14, wherein the one or more mitigation instructions comprises at least one of: changing an anomalous system call parameter to a specific value, changing an anomalous return value to a specific value, halting the system calls, or executing a script on the computing system.

16. The system according to claim 14, wherein the server is further configured to determine the one or more mitigation instructions based upon the maliciousness probability generated for the current system call.

17. The system according to claim 14, wherein the server is further configured to:
generate an output of the maliciousness probability for a graphical user interface of a user; and
receive an input of a mitigation instruction for the runtime system call via the graphical user interface from the user.

18. The system according to claim 11, wherein the server is further configured to determine that the runtime behavior for the runtime system call deviates from the normal behavior based on a hierarchical risk model comprising an attack tree.

19. The system according to claim 11, wherein the server is further configured to applying, by the server, a hybrid approach including a rules-based engine combined with the machine-learning model on one or more system calls.

20. The system according to claim 19, wherein the rules-based approach identifies anomalous behavior in the one or more system calls using at least one of: a system argument, a parameter, or a return value.

* * * * *